(12) United States Patent
Kuscher et al.

(10) Patent No.: US 9,634,726 B2
(45) Date of Patent: Apr. 25, 2017

(54) SEAMLESS TETHERING SETUP BETWEEN PHONE AND LAPTOP USING PEER-TO-PEER MECHANISMS

(71) Applicant: Google Inc., Mountain View, CA (US)

(72) Inventors: Alexander Friedrich Kuscher, San Francisco, CA (US); Trond Thomas Wuellner, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 12 days.

(21) Appl. No.: 13/668,132

(22) Filed: Nov. 2, 2012

(65) Prior Publication Data
US 2014/0127992 A1 May 8, 2014

(51) Int. Cl.
| | |
|---|---|
| *H04B 5/00* | (2006.01) |
| *H04B 5/02* | (2006.01) |
| *H04W 8/00* | (2009.01) |
| *H04W 4/00* | (2009.01) |

(52) U.S. Cl.
CPC .......... *H04B 5/0031* (2013.01); *H04W 4/008* (2013.01); *H04W 8/005* (2013.01); *H04B 5/0012* (2013.01); *H04B 5/02* (2013.01)

(58) Field of Classification Search
CPC .......... H04B 5/02; H04B 5/0012; H04B 5/00; H04B 5/0031; H04W 8/005; H04W 4/008
USPC ...................................................... 455/41.1
See application file for complete search history.

(56) References Cited

U.S. PATENT DOCUMENTS

| | | |
|---|---|---|
| 7,185,363 B1 | 2/2007 | Narin et al. |
| 7,382,268 B2 | 6/2008 | Hartman |
| 7,487,170 B2 | 2/2009 | Stevens |
| 7,603,435 B2 | 10/2009 | Welingkar et al. |
| 7,657,594 B2 | 2/2010 | Banga et al. |
| 7,697,942 B2 | 4/2010 | Stevens |
| 7,865,964 B2 | 1/2011 | Narin et al. |

(Continued)

FOREIGN PATENT DOCUMENTS

| | | |
|---|---|---|
| EP | 2503826 A1 | 9/2012 |
| KR | 10-2012-0055661 | 5/2012 |

(Continued)

OTHER PUBLICATIONS

"WiFi Tethering", <http://www.appbrain.com/app/wifi-tethering/og.android.tether>, Open Garden Inc., visited Sep. 16, 2013, 1 pg.

(Continued)

*Primary Examiner* — Devan Sandiford
(74) *Attorney, Agent, or Firm* — McDermott Will & Emery LLP

(57) ABSTRACT

The subject technology discloses configurations for determining, at a first computing device, if a second computing device is within a predetermined distance of the first computing device. The subject technology then establishes, at the first computing device, a wireless near field communication (NFC) connection with the second computing device. Information for configuring a wireless tethering connection with the second computing device is then transmitted over the wireless NFC connection. Further, the subject technology receives, over the wireless NFC connection, confirmation that the wireless tethering connection has been configured.

23 Claims, 6 Drawing Sheets

(56) References Cited

U.S. PATENT DOCUMENTS

| | | |
|---|---|---|
| 8,526,885 B2 | 9/2013 | Lin et al. |
| 8,793,758 B2 | 7/2014 | Raleigh et al. |
| 2003/0212800 A1* | 11/2003 | Jones et al. .................. 709/228 |
| 2004/0177276 A1 | 9/2004 | MacKinnon et al. |
| 2006/0258289 A1* | 11/2006 | Dua .............. 455/41.3 |
| 2007/0121541 A1 | 5/2007 | Matsuo |
| 2008/0090520 A1* | 4/2008 | Camp et al. ................ 455/41.2 |
| 2008/0095080 A1* | 4/2008 | Danzeisen et al. ........... 370/277 |
| 2008/0113665 A1 | 5/2008 | Paas et al. |
| 2009/0192937 A1* | 7/2009 | Griffin et al. .................. 705/42 |
| 2009/0260064 A1 | 10/2009 | McDowell et al. |
| 2010/0077447 A1 | 3/2010 | Dholakia et al. |
| 2010/0144314 A1* | 6/2010 | Sherkin et al. ............... 455/411 |
| 2010/0221999 A1 | 9/2010 | Braun et al. |
| 2011/0065384 A1* | 3/2011 | Cader et al. ................ 455/41.1 |
| 2011/0126009 A1* | 5/2011 | Camp et al. ................ 713/168 |
| 2011/0145445 A1 | 6/2011 | Malamant et al. |
| 2011/0171907 A1* | 7/2011 | Jolivet ......................... 455/41.1 |
| 2011/0250909 A1 | 10/2011 | Mathias et al. |
| 2011/0283001 A1 | 11/2011 | Jung et al. |
| 2011/0294502 A1 | 12/2011 | Oerton |
| 2011/0302643 A1 | 12/2011 | Pichna et al. |
| 2012/0026992 A1 | 2/2012 | Navda et al. |
| 2012/0030070 A1 | 2/2012 | Keller et al. |
| 2012/0143978 A1 | 6/2012 | Coussemaeker et al. |
| 2012/0214413 A1 | 8/2012 | Rose et al. |
| 2012/0240197 A1 | 9/2012 | Tran et al. |
| 2012/0253974 A1* | 10/2012 | Haikonen et al. ......... 705/26.41 |
| 2012/0254040 A1 | 10/2012 | Dixon et al. |
| 2012/0254142 A1 | 10/2012 | Knowlton et al. |
| 2012/0258658 A1* | 10/2012 | Matsuo ....................... 455/3.06 |
| 2012/0264375 A1* | 10/2012 | Shankaranarayanan ..... 455/41.2 |
| 2012/0324067 A1 | 12/2012 | Hari et al. |
| 2013/0029596 A1* | 1/2013 | Preston et al. ............... 455/41.1 |
| 2013/0347073 A1* | 12/2013 | Bryksa et al. .................... 726/4 |
| 2014/0004793 A1* | 1/2014 | Bandyopadhyay et al. . 455/41.1 |
| 2014/0007209 A1* | 1/2014 | Zucker .............. 726/7 |
| 2014/0080550 A1* | 3/2014 | Ino et al. ...................... 455/574 |
| 2014/0123232 A1 | 5/2014 | Kuscher et al. |
| 2014/0127994 A1* | 5/2014 | Nightingale et al. ........ 455/41.1 |
| 2015/0003432 A1 | 1/2015 | Tanaka |

FOREIGN PATENT DOCUMENTS

| | | |
|---|---|---|
| KR | 10-2012-0118038 | 10/2012 |
| WO | WO-2010/112064 A1 | 10/2010 |
| WO | WO-2011/101852 A2 | 8/2011 |
| WO | WO-2014/163965 A1 | 10/2014 |

OTHER PUBLICATIONS

"Barnacle Wifi Tether", <http://www.appbrain.com/app/barnacle-wifi-tether/net.szym.barnacle>, szym.net, visited Sep. 16, 2013, 1 pg.

"My Wi on Demand", <http://www.intelliborn.com/mywiondemand.html>, Intelliborn Corporation, visited Sep. 16, 2013, 1 pg.

Sharma, Ashish, et al., "Cool-Tether: Energy Efficient On-the-fly WiFi Hot-sports Using Mobile Phones", CoNEXT, Dec. 2009, 12 pgs.

Iglesias, Jesus, "Blue Car Tethering on Demand", Dec. 1, 2014, 2 pgs.

Rigney, et al., "Remote Authentication Dian in User Service (RADIUS)," Jun. 2000, retrieved from http://WFTP3.ITU.INT/AV-ARCH/JCTVE-SITE.

\* cited by examiner

SEAMLESS TETHERING SETUP BETWEEN PHONE AND LAPTOP USING PEER-TO-PEER MECHANISMS

BACKGROUND

The subject technology generally relates to tethering between computing devices in order to share network connectivity. One computing device may access another computing device's network connection by tethering with the other computing device. A configuration to utilize tethering between these two computing devices may require multiple steps that increase the difficulty of sharing the other computing device's networking connectivity.

SUMMARY

The subject technology provides for determining, at a first computing device, if a second computing device is within a predetermined distance of the first computing device; establishing, at the first computing device, a wireless near field communication (NFC) connection with the second computing device in which establishing the wireless NFC connection is responsive to the determination that the first computing device is within the predetermined distance of the second computing device; transmitting, over the wireless NFC connection, information for configuring a wireless tethering connection with the second computing device; and receiving, over the wireless NFC connection, confirmation that the wireless tethering connection has been configured.

The subject technology further provides determining, at a first computing device, if a second computing device is within a predetermined distance of the first computing device; establishing, at the first computing device, a wireless near field communication (NFC) connection with the second computing device in which establishing the wireless NFC connection is responsive to the determination that the first computing device is within the predetermined distance of the second computing device; receiving, over the wireless NFC connection, information for configuring a wireless tethering connection with the second computing device; performing, at the first computing device, a configuration to set up the wireless tethering connection with the second computing device; and transmitting, over the wireless NFC connection, a confirmation that the wireless tethering connection has been configured to the second computing device.

Yet another aspect of the subject technology provides a system. The system includes memory, one or more processors, and one or more modules stored in memory and configured for execution by the one or more processors. The system includes a wireless near field communication (NFC) module configured to determine if a computing device is within a predetermined distance, establish a wireless NFC connection with the computing device in which establishing the wireless NFC connection is responsive to the determination that the computing device is within the predetermined distance. The system further includes a wireless tethering module configured to transmit, over the wireless NFC connection, information for configuring a wireless tethering connection with the computing device, and receive, over the wireless NFC connection, confirmation that the wireless tethering connection has been configured.

The subject technology further provides for determining, at a first computing device, if a second computing device is within a predetermined distance of the first computing device; establishing, at the first computing device, a wireless near field communication (NFC) connection with the second computing device in which establishing the wireless NFC connection is responsive to the determination that the first computing device is within the predetermined distance of the second computing device; transmitting, over the wireless NFC connection, information for configuring a wireless tethering connection with the second computing device; receiving, over the wireless NFC connection, confirmation that the wireless tethering connection has been configured; and transmitting, over the wireless tethering connection, data from a web browser to access one or more web sites on the Internet.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
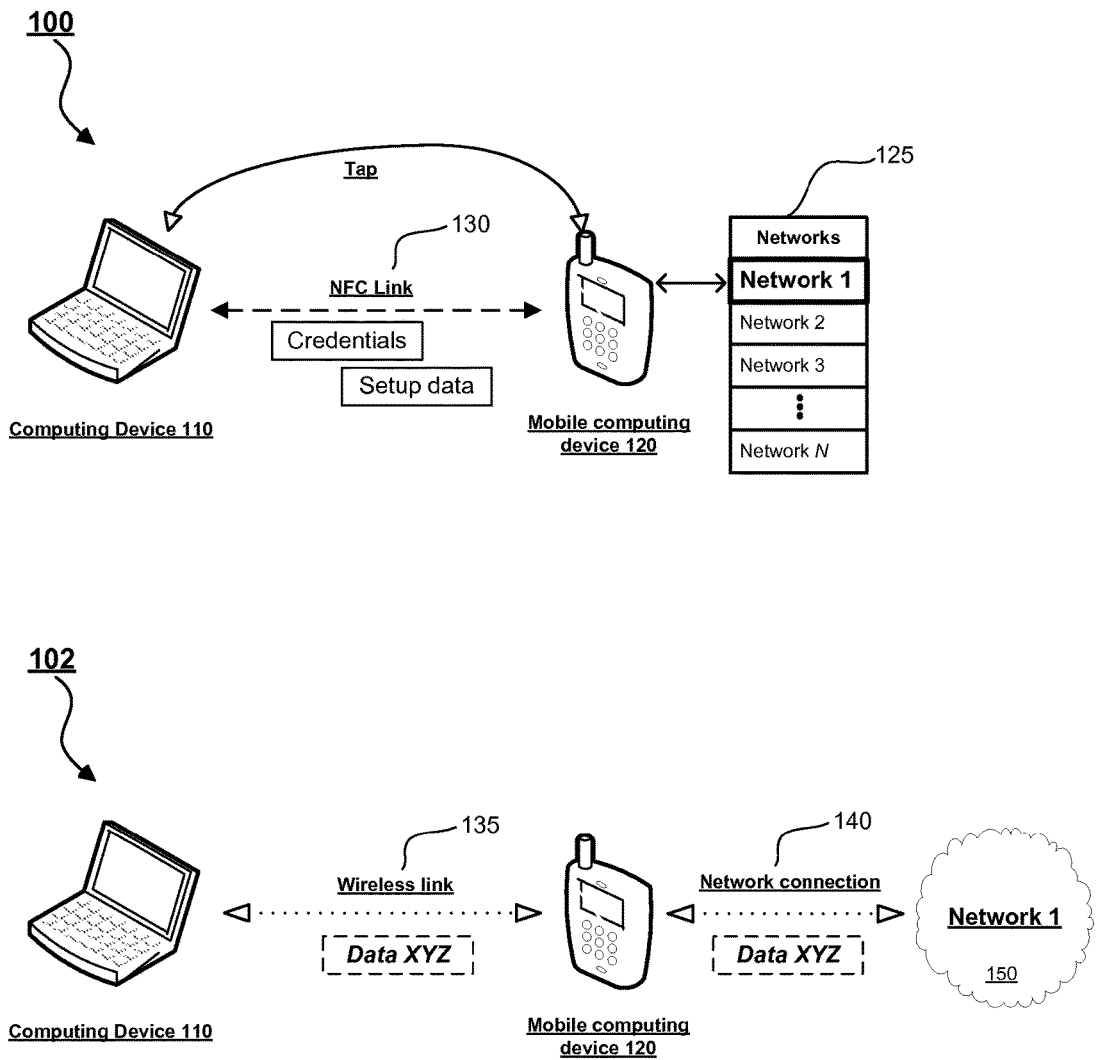
FIG. 1 conceptually illustrates an example of configuring a wireless tethering connection between two computing devices according to some configurations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Existing implementations for wireless tethering may involve a multitude of steps that contribute to a difficult process for establishing wireless tethering between computing devices. To address such issues, the subject technology provides automatic wireless tethering from a device requiring an Internet connection to a second device with Internet access by using a wireless near field communication (NFC) connection (or other near field communication technologies) to set up a wireless tethering connection between the devices.

In one example, a first and second computing device, such as a laptop and mobile device each with NFC capabilities, are provided. The mobile device in this example acts as a hotspot for providing Internet access for the laptop. An automatic process for establishing a wireless tethering connection is then initiated by tapping one of the devices onto the other device, which brings the devices within a threshold distance for exchanging information via near field communications over a NFC connection. In this regard, the laptop transfers, via the NFC connection, information such as an intent (e.g. a request for setting up a hotspot), credentials (hotspot SSID, password) and/or its MAC address with the mobile device. Based on the information, the mobile device subsequently performs a configuration involving one or more operations such as setting up a hotspot connection (e.g., the wireless tethering connection), adding the laptop's MAC address to a list of restricted MAC addresses for accessing the hotspot connection, etc. Confirmation that the hotspot connection is configured may then be transmitted via the NFC connection back to the laptop (e.g., via the NFC connection). A user on the laptop may then utilize the hotspot connection for accessing the Internet via the mobile device.

Although the above description describes utilizing NFC for establishing a wireless tethering connection, other types of technologies may be utilized and still be within the scope of the subject technology. For instance, technologies such as Wi-Fi, BLUETOOH, WLAN, etc., may be utilized for establishing the wireless tethering connection. Additionally, the above example is described assuming that the hotspot connection is automatically selected via a single Internet access point. However, in some instances, a particular device may have access to a multiple Internet access points (e.g., different routers, etc.). In such an example, the device with access to multiple access points may return a list of possible network connections to the other device for selection in order to establish a wireless tethering connection with the device that provides Internet access. In some instances, a particular Internet access point among multiple access points may be automatically selected based on criteria such as signal strength or another metric.

FIG. 1 conceptually illustrates an example of configuring a wireless tethering connection between two computing devices according to some configurations of the subject technology. As shown in the example of FIG. 1, configuration of a wireless tethering connection between two respective computing devices 110 (e.g., a laptop) and 120 (e.g., a smartphone) is shown in different stages 100 and 102. Each of the computing devices may include hardware (e.g., NFC reader) for providing near-field communications over an NFC link or connection. Additionally, each of the computing devices may include hardware for establishing wireless network connectivity (e.g., Wi-Fi) between the computing devices.

In the stage 100, the computing device 110 initiates communication by tapping, or moving within a predetermined distance or proximity within, the mobile computing device 120. In this manner, an NFC link 130 may be established between the computing device 110 and the mobile computing device 120. In one example, information for setting up the NFC link may be exchanged between the computing device 110 and the mobile computing device 120. Based on this information, the mobile computing device 120 may perform a configuration of the NFC link 130. In some instances, a confirmation message or acknowledgment may be transmitted to the computing device 110 that the NFC link 130 has been successfully established.

As further shown in the stage 100, the mobile computing device 120 may have access to one or more network connections 125 corresponding to respective access points to a network (e.g., the Internet). In the example of FIG. 1, the computing device 110 may exchange, over the NFC link 130, information such as credentials and/or setup data for establishing a wireless tethering connection with one of the network connections from among the networks connections 125. Other types of information may be provided and still be within the scope of the subject technology.

In the stage 102, after the wireless tethering connection has been established, the computing device 110 transmits data for accessing one or more web sites on the Internet over a wireless link 135 to the mobile computing device 120. The data may be transmitted over a network connection 140 to a network 150 for accessing the web site on the Internet. Other types of data may be provided by the computing device 110 and transmitted over the wireless link 135 and still be within the scope of the subject technology. Further, the computing device 110 may transmit data to access other computing devices or systems via the network 150 in addition to web sites. By way of example, the computing device 110 may access one or more computing devices or systems that provide cloud-based services (e.g., cloud storage, cloud media servers, etc.).

Although the example shown in FIG. 1 illustrates a scenario in which the computing device 110 accesses the network connection provided by the mobile computing device 120, it should be appreciated that the mobile computing device 120 could share a network connection(s) to an access point(s) provided via the computing device 110 and still be within the scope of the subject technology.

Figure 2:
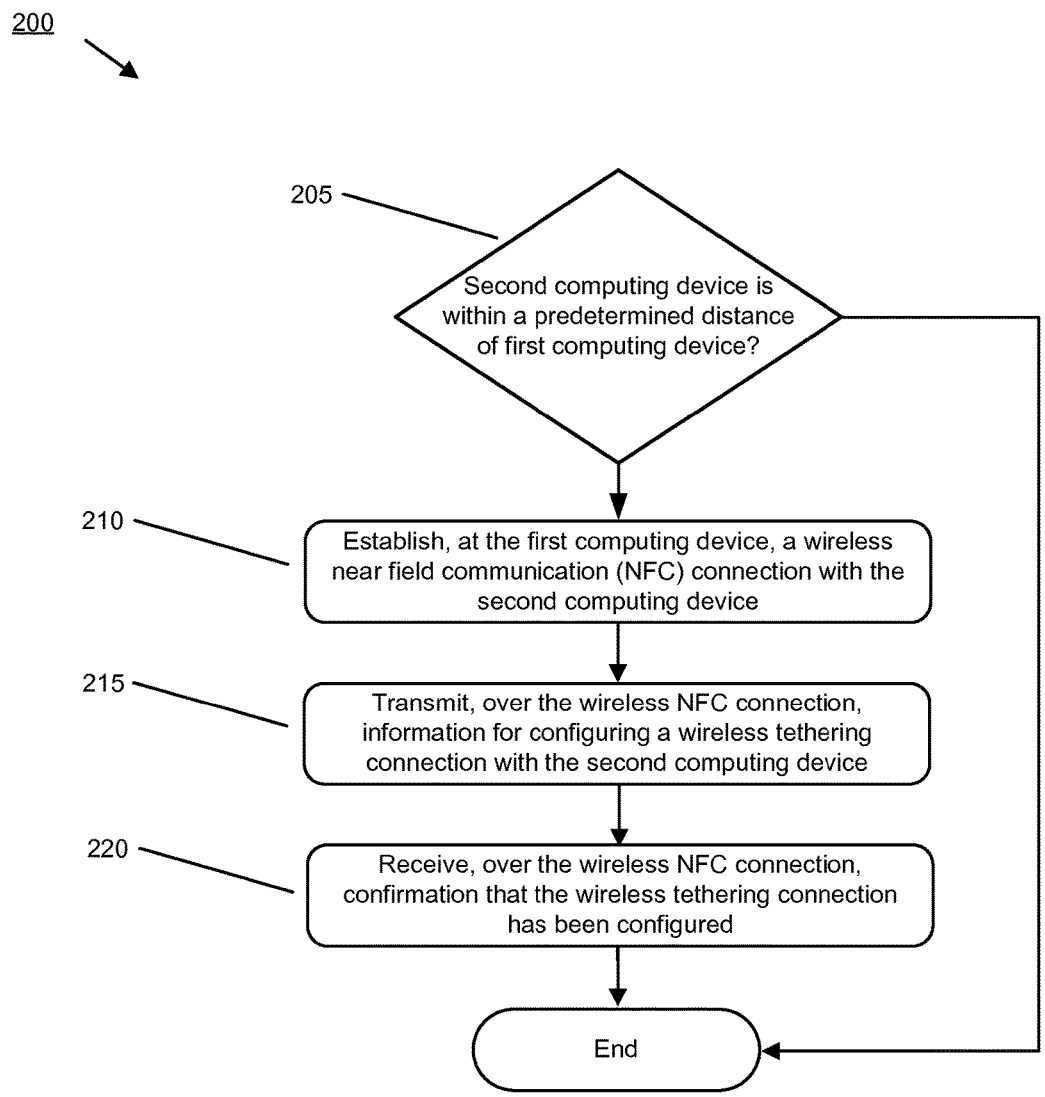
FIG. 2 conceptually illustrates an example process transmitting a request for establishing a wireless tethering connection according to some configurations of the subject technology.

FIG. 2 conceptually illustrates an example process 200 for transmitting a request for establishing a wireless tethering connection according to some configurations of the subject technology. The process 200 can be performed on one or more computing devices or systems in some configurations. More specifically, the process 200 may be implemented for requesting a wireless tethering connection as described in the example of FIG. 1.

The process 200 begins at 205 by determining, at a first computing device, if a second computing device is within a predetermined distance of the first computing device. If it is determined that a second computing device is not within the predetermined distance of the first computing device, the process 200 then ends. In some configurations, the first computing device is a laptop computing device and the second computing device is a mobile device. Determining if the first computing device is within the predetermined distance of the second computing device is responsive to the first computing device physically tapping the second computing device in one example (or vice versa). The predetermined distance corresponds with a communication range of the NFC connection so that the two respective devices can successfully communicate in some configurations.

If it is determined at 205 that a second computing device is within the predetermined distance of the first computing device, the process 200 continues to 210 to establish, at the first computing device, a wireless near field communication (NFC) connection with the second computing device. In one example, establishing the wireless NFC connection is responsive to the determination that the first computing device is within the predetermined distance of the second computing device.

The process 200 at 215 transmits, over the wireless NFC connection, information for configuring a wireless tethering connection with the second computing device. In some configurations, information for setting up a wireless tethering connection with the second computing device includes a request for setting up the wireless tethering connection, credential information, or a network interface address of the first computing device. For instance, the credential information includes a username and password. Moreover, the credential information may include a subscriber identification information for authenticating a user and/or a user's device. Additionally, the credential information may include a verified certificate (e.g., from a trusted third party certificate authority, etc.) for authenticating a user. The network interface address may include a unique identifier assigned to a network interface (e.g., MAC address, etc.) of the first computing device.

The process 200 at 220 receives, over the wireless NFC connection, confirmation that the wireless tethering connection has been configured. Once the wireless tethering connection has been configured, the process 200 may transmit, over the wireless tethering connection, data from a web browser running on the first computing device to access one or more web sites on the Internet (e.g., as illustrated in FIG. 1). Other types of applications running on the first computing device may transmit data over the wireless tethering connection and still be within the scope of the subject technology. The process 200 then ends.

Figure 3:
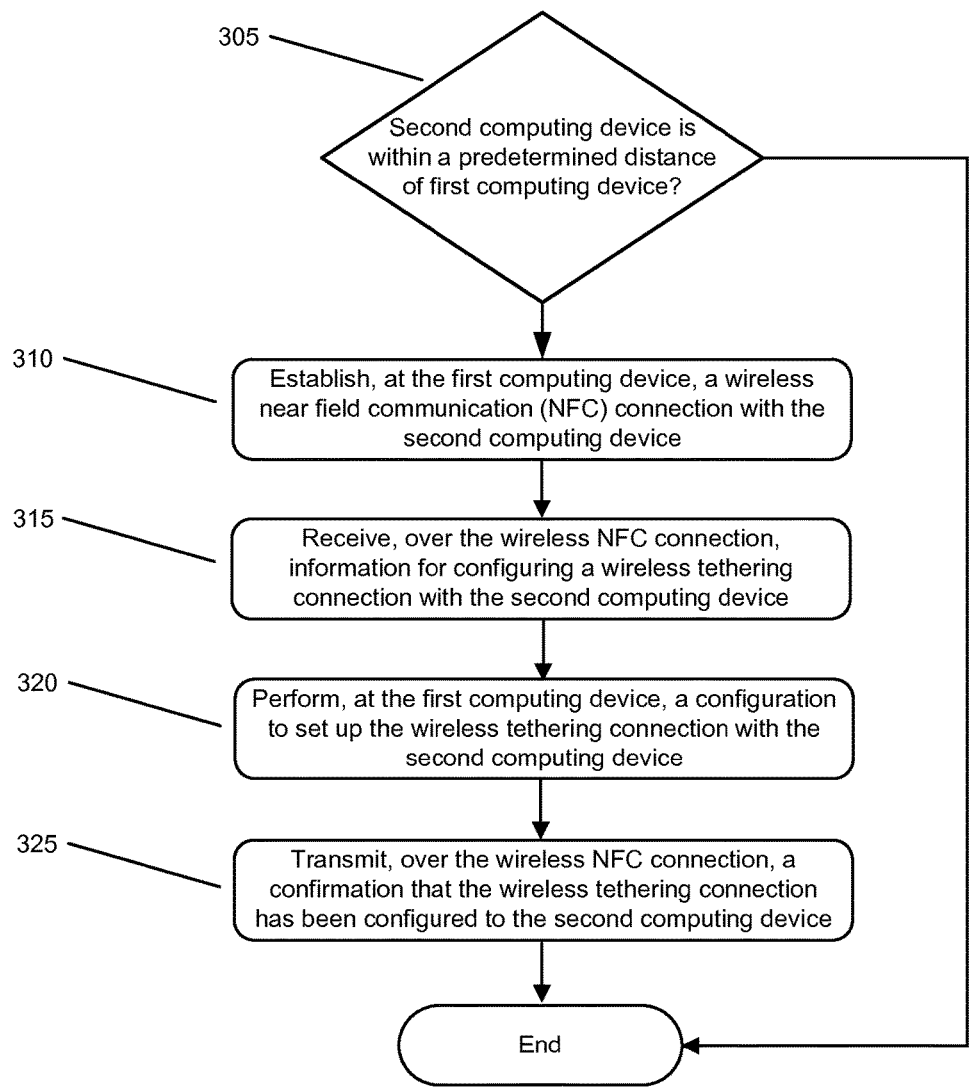
FIG. 3 conceptually illustrates an example process for receiving a request for establishing a wireless tethering connection according to some configurations of the subject technology.

FIG. 3 conceptually illustrates an example process 300 for receiving a request for establishing a wireless tethering connection according to some configurations of the subject technology. The process 300 can be performed on one or more computing devices or systems in some configurations. More specifically, the process 300 may be implemented for setting up a wireless tethering connection as described in the example of FIG. 1.

The process 300 begins at 305 by determining, at a first computing device, if a second computing device is within a predetermined distance of the first computing device. In some configurations, the first computing device is a mobile device and the second computing device is a laptop computing device (or vice versa). If it is determined that the second computing device is not within the predetermined distance of the first computing device, the process 300 then ends.

Alternatively, if the process 300 determines at 305 that a second computing device is within the predetermined distance of the first computing device, the process 300 continues to 310 to establish, at the first computing device, a wireless near field communication (NFC) connection with the second computing device. Establishing the wireless NFC connection is responsive to the determination that the first computing device is within the predetermined distance of the second computing device in some configurations.

At 315, the process 300 receives, over the wireless NFC connection, information for configuring a wireless tethering connection with the second computing device. By way of example, the information may include a request for setting up the wireless tethering connection, credential information, or a network interface address of the second computing device.

The process 300 at 320 performs, at the first computing device, a configuration to set up the wireless tethering connection with the second computing device. In some configurations, the configuration to set up the wireless tethering connection includes 1) setting up a hotspot connection for accessing the Internet based on information for configuring the wireless tethering connection with the second computing device, and 2) adding a network interface address of the second computing device to a list of restricted network interface address for accessing the hotspot connection.

The process 300 at 325 transmits, over the wireless NFC connection, a confirmation that the wireless tethering connection has been configured to the second computing device. The confirmation may be a notification message or acknowledgement that the wireless tethering connection has been successfully established. In some configurations, after the wireless tethering connection has been established, the process 300 may receive, over the wireless tethering connection, data from a web browser running on the second computing device to access one or more web sites on the Internet. Other types of data may be received from other applications running on the second computing device over the wireless tethering connection and still be within the scope of the subject technology. The process 300 then ends.

Figure 4:
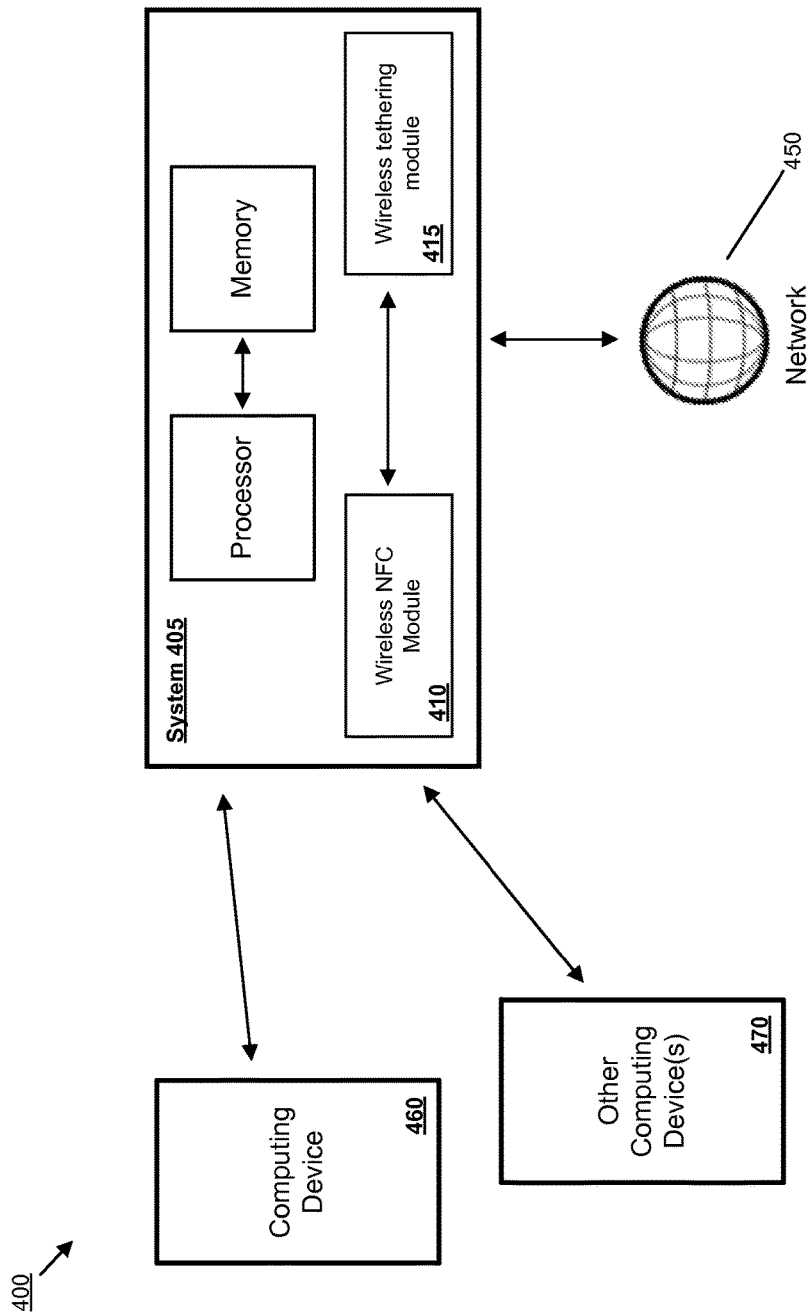
FIG. 4 conceptually illustrates an example computing environment including a system.

FIG. 4 conceptually illustrates an example computing environment 400 including a system. In particular, FIG. 4 shows a system 405 for implementing the above described operations in FIG. 1 and the processes in FIGS. 2 and 3. In some configurations, the system 405 is part of an implementation running a particular machine (e.g., client computer, laptop, mobile device, notebook, netbook, etc.).

The system 405 can include memory, one or more processors, and one or more modules stored in memory and configured for execution by the one or more processors. As shown in FIG. 4, the system 405 includes several modules for providing different functionality. The system 405 is configured to include a wireless near field communication (NFC) module 410 and a wireless tethering module 415.

In some configurations, the wireless NFC module 410 is configured to determine if a computing device is within a predetermined distance, establish a wireless NFC connection with the computing device in which establishing the wireless NFC connection is responsive to the determination that the computing device is within the predetermined distance.

In some configurations, the wireless tethering module 415 is configured to transmit, over the wireless NFC connection, information for configuring a wireless tethering connection with the computing device, and receive, over the wireless NFC connection, confirmation that the wireless tethering connection has been configured. The wireless tethering module 415 is further configured to transmit, over the wireless tethering connection, data from a web browser to access one or more web sites on the Internet.

The wireless NFC module 410 is further configured to determine if a second computing device is within a predetermined distance, and establish a second wireless near field communication (NFC) connection with the second computing device in which establishing the wireless NFC connection is responsive to the determination that the second computing device is within the predetermined distance.

The wireless tethering module 415 is further configured to receive, over the wireless NFC connection, information for configuring a wireless tethering connection with the second computing device, perform a configuration to set up the wireless tethering connection with the second computing device, and transmit, over the wireless NFC connection, a confirmation that the wireless tethering connection has been configured to the second computing device. Additionally, the wireless tethering module 415 is further configured to receive, over the wireless tethering connection, data from a web browser running on the second computing device to access one or more web sites on the Internet.

As further shown in FIG. 4, each of the aforementioned modules can be configured to communicate between each other. For instance, different data, messages, API calls and returns can be passed between the different modules in the system 405. In addition, the system 405 may communicate with a computing device 460 or other computing device(s) 470. The system 405 may communicate over a network 450 with one or more web sites, servers, etc.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

Figure 5:
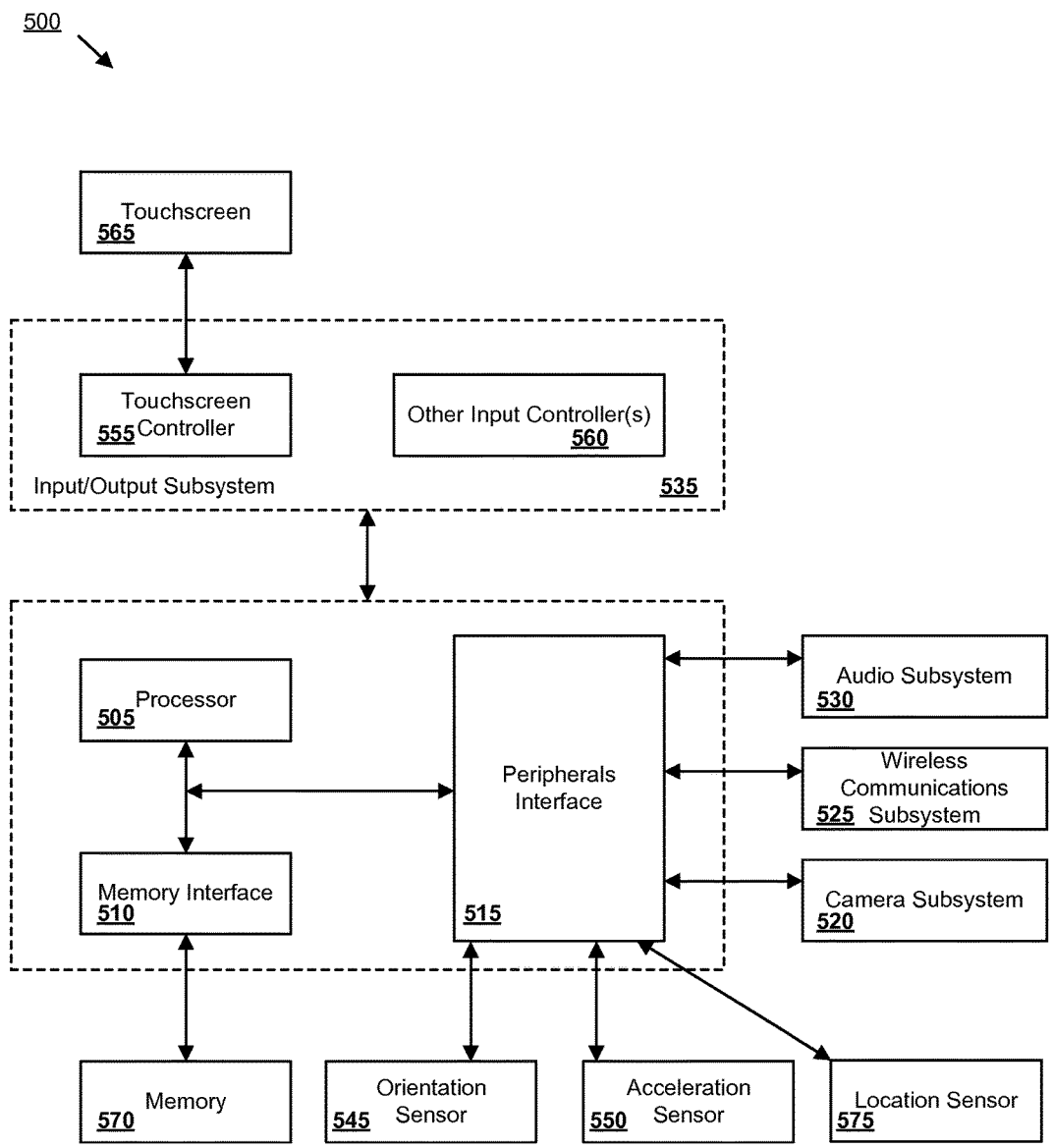
FIG. 5 conceptually illustrates an example of a mobile device architecture.

FIG. 5 is an example of a mobile device architecture 500. The implementation of a mobile device can include one or more processing units 505, memory interface 510 and a peripherals interface 515. Each of these components that make up the computing device architecture can be separate components or integrated in one or more integrated circuits. These various components can also be coupled together by one or more communication buses or signal lines.

The peripherals interface 515 can be coupled to various sensors and subsystems, including a camera subsystem 520, a wireless communication subsystem(s) 525, audio subsystem 530 and Input/Output subsystem 535. The peripherals interface 515 enables communication between processors and peripherals. The peripherals provide different functionality for the mobile device. Peripherals such as an orientation sensor 545 or an acceleration sensor 550 can be coupled to the peripherals interface 515 to facilitate the orientation and acceleration functions. Additionally, the mobile device can include a location sensor 575 to provide different location data. In particular, the location sensor can utilize a Global Positioning System (GPS) to provide different location data such as longitude, latitude and altitude.

The camera subsystem 520 can be coupled to one or more optical sensors such as a charged coupled device (CCD) optical sensor or a complementary metal-oxide-semiconductor (CMOS) optical sensor. The camera subsystem 520 coupled with the sensors can facilitate camera functions, such as image and/or video data capturing. Wireless communication subsystems 525 can serve to facilitate communication functions. Wireless communication subsystems 525 can include radio frequency receivers and transmitters, and optical receivers and transmitters. The aforementioned receivers and transmitters can be implemented to operate over one or more communication networks such as a Long Term Evolution (LTE), Global System for Mobile Communications (GSM) network, a Wi-Fi network, Bluetooth network, etc. The audio subsystem 530 is coupled to a speaker and a microphone to facilitate voice-enabled functions, such as voice recognition, digital recording, etc.

I/O subsystem 535 involves the transfer between input/output peripheral devices, such as a display, a touchscreen, etc., and the data bus of the processor 505 through the Peripherals Interface. I/O subsystem 535 can include a touchscreen controller 555 and other input controllers 50 to facilitate these functions. Touchscreen controller 555 can be coupled to the touchscreen 55 and detect contact and movement on the screen using any of multiple touch sensitivity technologies. Other input controllers 50 can be coupled to other input/control devices, such as one or more buttons.

Memory interface 510 can be coupled to memory 570, which can include high-speed random access memory and/or non-volatile memory such as flash memory. Memory 570 can store an operating system (OS). The OS can include instructions for handling basic system services and for performing hardware dependent tasks.

By way of example, memory can also include communication instructions to facilitate communicating with one or more additional devices, graphical user interface instructions to facilitate graphic user interface processing, image/video processing instructions to facilitate image/video-related processing and functions, phone instructions to facilitate phone-related processes and functions, media exchange and processing instructions to facilitate media communication and processing-related processes and functions, camera instructions to facilitate camera-related processes and functions, and video conferencing instructions to facilitate video conferencing processes and functions. The above identified instructions need not be implemented as separate software programs or modules. Various functions of mobile device can be implemented in hardware and/or in software, including in one or more signal processing and/or application specific integrated circuits.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

The following description describes an example system in which aspects of the subject technology can be implemented.

Figure 6:
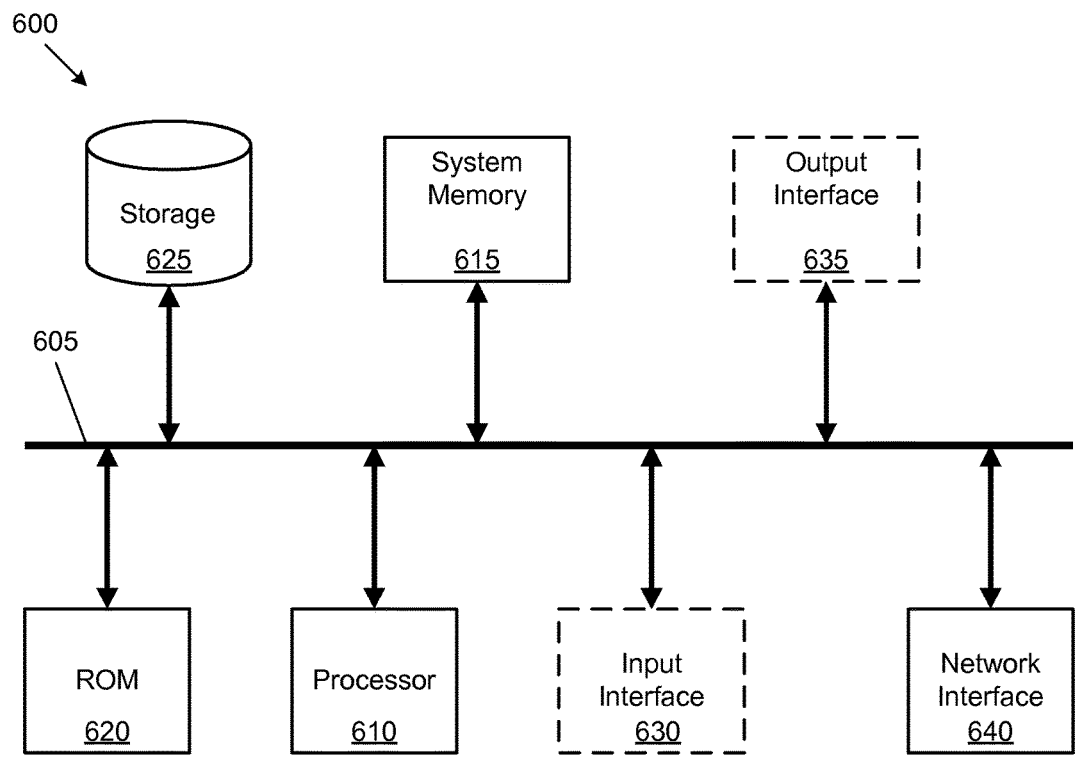
FIG. 6 conceptually illustrates a system with which some implementations of the subject technology may be implemented.

FIG. 6 conceptually illustrates a system 600 with which some implementations of the subject technology can be implemented. The system 600 can be a computer, phone, PDA, or another sort of electronic device. In some configurations, the system 600 includes a television with one or more processors embedded therein. Such a system includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only memory 620, the system memory 615, and the storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the subject technology use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the subject technology's processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. The components of system 600 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." An aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
    identifying, at a first computing device, that a connection to an Internet is required;
    in response to the identifying, determining, at the first computing device, if a second computing device that has the connection to the Internet is within a predetermined distance of the first computing device;
    establishing, at the first computing device, a wireless near field communication (NFC) connection with the second computing device, wherein establishing the wireless NFC connection is responsive to the determination that the first computing device is within the predetermined distance of the second computing device;
    transmitting, over the wireless NFC connection by the first computing device, information for configuring another wireless connection between the first computing device and the second computing device;
    receiving, over the wireless NFC connection and prior to connecting to the another wireless connection, a confirmation message that indicates that the another wireless connection between the first computing device and the second computing device has been configured to be connected to by the first computing device; and
    upon receiving the confirmation message over the wireless NFC connection, connecting to the another wireless connection of the second computing device and accessing the connection to the Internet of the second computing device through the another wireless connection.

2. The method of claim 1, wherein the first computing device is a laptop computing device.

3. The method of claim 1, wherein the second computing device is a mobile device.

4. The method of claim 1, wherein determining if the first computing device is within the predetermined distance of the second computing device is responsive to the first computing device physically tapping the second computing device.

5. The method of claim 1, wherein the predetermined distance corresponds with a communication range of the NFC connection.

6. The method of claim 1, wherein the information for configuring the another wireless connection between the first computing device and the second computing device includes a request for setting up the another wireless connection, credential information, or a network interface address of the first computing device.

7. The method of claim 6, wherein the credential information comprises a username and password.

8. The method of claim 6, wherein the credential information comprises a subscriber identification information.

9. The method of claim 6, wherein the credential information comprises a verified certificate.

10. The method of claim 6, wherein the network interface address comprises a unique identifier assigned to a network interface of the first computing device.

11. The method of claim 1, wherein accessing the connection to the Internet of the second computing device through the another wireless connection comprises:
    transmitting, by the first computing device over the another wireless connection to the second computing device, a request for a web page on the Internet; and
    receiving, by the first computing device over the another wireless connection from the second computing device, the requested web page, wherein the web page is retrieved from the Internet via the connection to the Internet of the second computing device.

12. A computer-implemented method, the method comprising:
    determining, at a first computing device, if a second computing device is within a predetermined distance of the first computing device, wherein the first computing device has a connection to an Internet;
    establishing, at the first computing device, a wireless near field communication (NFC) connection with the second computing device, wherein establishing the wireless NFC connection is responsive to the determination that the first computing device is within the predetermined distance of the second computing device;
    receiving, over the wireless NFC connection, information for configuring a wireless tethering connection with the second computing device;
    performing, at the first computing device, a configuration to set up the wireless tethering connection with the second computing device;
    transmitting, over the wireless NFC connection, a confirmation that the wireless tethering connection between the first computing device and the second computing device has been configured to be connected to by the second computing device;
    receiving, over the wireless tethering connection from the second computing device, a request for data on the Internet and forwarding the request over the connection to the Internet; and
    receiving, over the connection to the Internet, the requested data and forwarding the requested data to the second computing device over the wireless tethering connection.

13. The method of claim 12, wherein the first computing device is a mobile device and the second computing device is a laptop computing device.

14. The method of claim 12, wherein performing, at the first computing device, the configuration to set up the wireless tethering connection with the second computing device further comprises:
    transmitting, by the first computing device, an indication of a plurality of connections to the Internet;
    receiving, by the first computing device, a selection, by the second computing device, of one of the plurality of connections; and
    establishing, by the first computing device, the selected one of the plurality of connections to the Internet.

15. The method of claim 14, further comprising:
    providing, by the first computing device, the second computing device with access to the Internet through the first computing device and through the selected one of the plurality of connections.

16. The method of claim 12, wherein performing, at the first computing device, the configuration to set up the wireless tethering connection comprises:
    setting up a hotspot connection for accessing the Internet through the first computing device based at least in part on the information for configuring the wireless tethering connection with the second computing device; and
    adding, by the first computing device, a network interface address of the second computing device to a list of restricted network interface addresses for connecting to the hotspot connection at the first computing device.

17. The method of claim 12, further comprising:
    receiving, over the wireless tethering connection, data from a web browser running on the second computing device to access one or more web sites on the Internet through the first computing device.

18. A system, the system comprising:
    memory;
    one or more processors;
    one or more modules stored in memory and configured for execution by the one or more processors, the modules comprising:
        a wireless near field communication (NFC) module configured to determine if a computing device with a connection to an Internet is within a predetermined distance, establish a wireless NFC connection with the computing device, wherein establishing the wireless NFC connection is responsive to the determination that the computing device with the connection to the Internet is within the predetermined distance;
        a wireless tethering module configured to transmit, over the wireless NFC connection, information for configuring a wireless tethering connection between the system and the computing device, receive, over the wireless NFC connection, confirmation that the wireless tethering connection has been configured; and
        a wireless local area network (WLAN) module that is configured to directly connect to the Internet when the Internet is accessible to the WLAN module, and upon receipt of the confirmation, connect to the wireless tethering connection of the computing device and access the Internet through the connection of the computing device via the wireless tethering connection.

19. The system of claim 18, wherein the wireless tethering module is further configured to:
   transmit, over the wireless tethering connection, data from a web browser to access one or more web sites on the Internet through the computing device.

20. The system of claim 18, wherein the wireless NFC module is further configured to:
   determine if a second computing device is within a predetermined distance; and
   establish a second wireless near field communication (NFC) connection with the second computing device, wherein establishing the wireless NFC connection is responsive to the determination that the second computing device is within the predetermined distance.

21. The system of claim 20, wherein the wireless tethering module is further configured to:
   receive, over the wireless NFC connection, information for configuring a wireless tethering connection with the second computing device;
   perform a configuration to set up the wireless tethering connection with the second computing device; and
   transmit, over the wireless NFC connection, a confirmation that the wireless tethering connection has been configured to the second computing device.

22. The system of claim 21, wherein the wireless tethering module is further configured to:
   receive, over the wireless tethering connection, data from a web browser running on the second computing device to access one or more web sites on the Internet.

23. A non-transitory machine-readable medium comprising instructions stored therein, which when executed by a machine, cause the machine to perform operations comprising:
   identifying, at a first computing device that a connection to an Internet is unavailable;
   in response to the identifying, determining, at the first computing device, if a second computing device is within a predetermined distance of the first computing device;
   establishing, at the first computing device, a wireless near field communication (NFC) connection with the second computing device, wherein establishing the wireless NFC connection is responsive to the determination that the first computing device is within the predetermined distance of the second computing device;
   transmitting, over the wireless NFC connection by the first computing device, information for configuring a wireless tethering connection between the first computing device and the second computing device;
   waiting, by the first computing device, for an acknowledgment message indicating that the wireless tethering connection has been configured before connecting to the wireless tethering connection;
   receiving, at the first computing device and over the wireless NFC connection, the acknowledgment message indicating that the wireless tethering connection has been configured;
   in response to receiving the acknowledgment message, connecting to the wireless tethering connection; and
   transmitting, over the wireless tethering connection between the first computing device and the second computing device, data from a web browser of the first computing device to access one or more web sites on the Internet through the second computing device.

* * * * *